（12） United States Patent
MacInnis et al.

(10) Patent No.: US 7,262,806 B2
(45) Date of Patent: Aug. 28, 2007

(54) SYSTEM AND METHOD FOR ALIGNED COMPRESSION OF INTERLACED VIDEO

(75) Inventors: Alexander G. MacInnis, Los Altos, CA (US); José R. Alvarez, Sunnyvale, CA (US); Sheng Zhong, Fremont, CA (US)

(73) Assignee: Broadcom Corporation, Irvine, CA (US)

( * ) Notice: Subject to any disclaimer, the term of this patent is extended or adjusted under 35 U.S.C. 154(b) by 415 days.

(21) Appl. No.: 10/293,730

(22) Filed: Nov. 12, 2002

(65) Prior Publication Data

US 2003/0095203 A1 May 22, 2003

Related U.S. Application Data

(60) Provisional application No. 60/332,206, filed on Nov. 21, 2001.

(51) Int. Cl.
H04N 7/01 (2006.01)
H04N 7/12 (2006.01)
H04N 11/20 (2006.01)

(52) U.S. Cl. .................. 348/441; 348/442; 348/426.1; 348/511; 386/111

(58) Field of Classification Search .............. 348/441, 348/442, 426.1, 511; 386/111; H04N 7/01, H04N 7/12, 11/20
See application file for complete search history.

(56) References Cited

U.S. PATENT DOCUMENTS

| | | | | | |
|---|---|---|---|---|---|
| 5,070,395 | A | * | 12/1991 | Kitaura et al. | 348/445 |
| 5,574,508 | A | * | 11/1996 | Diamant | 348/511 |
| 5,712,687 | A | * | 1/1998 | Naveen et al. | 348/453 |
| 5,767,898 | A | * | 6/1998 | Urano et al. | 348/43 |
| 5,963,261 | A | * | 10/1999 | Dean | 348/446 |
| 6,075,556 | A | * | 6/2000 | Urano et al. | 348/43 |
| 6,104,865 | A | * | 8/2000 | Hamaguchi et al. | 386/123 |
| 6,151,363 | A | * | 11/2000 | Burl et al. | 375/240.17 |
| 6,278,733 | B1 | * | 8/2001 | Bennett et al. | 375/240 |
| 6,281,873 | B1 | * | 8/2001 | Oakley | 345/418 |
| 6,289,132 | B1 | * | 9/2001 | Goertzen | 382/240 |
| 6,327,000 | B1 | * | 12/2001 | Auld et al. | 348/441 |
| 6,411,333 | B1 | * | 6/2002 | Auld et al. | 348/441 |
| 6,665,344 | B1 | * | 12/2003 | Fimoff | 375/240.2 |
| 6,873,368 | B1 | * | 3/2005 | Yu et al. | 348/441 |
| 6,928,191 | B2 | * | 8/2005 | Goertzen | 382/240 |
| 6,944,226 | B1 | * | 9/2005 | Lin et al. | 375/240.2 |

(Continued)

FOREIGN PATENT DOCUMENTS

EP 0790737 A 8/1997

OTHER PUBLICATIONS

ISO/IEC 13818-1, *Information technology—Generic coding of moving pictures and associated audio information: Systems*.

(Continued)

*Primary Examiner*—Brian P. Yenke
(74) *Attorney, Agent, or Firm*—McAndrews, Held & Malloy, Ltd.

(57) ABSTRACT

A method and system are disclosed for vertically phase shifting fields of at least one interlaced frame of video into at least two vertically aligned frames of video. The at least two vertically aligned frames of video are compressed, transmitted or stored, decompressed, and phase shifted a second time to generate at least one interlaced frame of video.

3 Claims, 5 Drawing Sheets

Vertical Phase Shift of Top Field To Even Frame Before Encoding

U.S. PATENT DOCUMENTS

2005/0089313 A1* 4/2005 Wada et al. ............... 386/117

OTHER PUBLICATIONS

Li R et al: "An Arbitrary Ratio Resizer for MPEG Applications", IEEE Transactions on Consumer Electronics, IEEE Inc. New York, US. vol. 46 No. 3, Aug. 2000, pp. 467-473 XP001142868.

Yanubin Y et al: "Interlaced Video Coding with Field-Based Multiresolution Representation", Signal Processing, Image Communication, Elsiever Science Publishers, Amsterdam, NL vol. 5 No. 1/2, Feb. 1, 1993, pp. 185-198. XP000345620.

Zaccarin A et al: "Coding of Interlaced Sequences Using a Decoder-Based Adaptive Deinterlacer", Statistical Signal and Array Processing, Minneapolis, Apr. 27-30, 1993,Proceedings of the International Conference on Acoustics, Speech, and Signal Processing (ICASSP), New York, IEEE, US. vol. 4 No. 27, Apr. 27, 1993, pp. 377-380. XP10110881.

Intihar B: "Video-Conversion Techniques Ensure A Sharper Image", EDN Electrical Design News,Rogers Pub. Co. Englewood, Co. US. vol. 43 No. 6, Mar. 13, 1998, pp. 97-98, 100, 102. XP000869385.

De Haan G et al: "On Video Formats and Coding Efficiency", 1999 Digest of Technical Papers, International Conference on Consumer Electronics (Cat. No. 99CH36277) IEEE Piscataway,NJ, USA, 1999, pp. 328-329, XP002330094.

* cited by examiner

SYSTEM AND METHOD FOR ALIGNED COMPRESSION OF INTERLACED VIDEO

RELATED APPLICATIONS

The applicants claim priority based on provisional application No. 60/332,206 filed Nov. 21, 2001, the complete subject matter of which is incorporated herein by reference in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Television (TV) content distribution is quickly migrating from analog formats to compressed digital formats. TV content is distributed digitally today via satellite, cable, terrestrial (RF), DSL, DVD, Internet, and other transmission and storage means. It is a perennial problem to minimize the bit rate of the compressed signal while maximizing the final video quality. Various companies and standards bodies are fiercely competing to provide methods to minimize the compressed bit rate while providing acceptable video quality. Such competition continues to be very active, even though the MPEG-2 video standard (ISO/IEC 13818-2) has been final for several years and many millions of TV receivers are in use today that implement the MPEG-2 standard. A technology solution that can reduce the compressed bit-rate by even a few percent without hurting the final picture quality can gain a significant advantage over existing technologies.

Video content distributed for TVs can be segmented into two classes: progressive content and interlaced content. Conventional TVs are typically interlaced displays. Interlaced content is very common in the TV world; most TV content, that is not movies, is interlaced. Some interlaced content, such as sports, has fast motion, and faithful reproduction of the video depends on retaining the 60 field per second (in NETS video) temporal resolution of interlaced video (or 50 fields per second in some standards). The vast majority of TV cameras today are interlaced, and the infrastructure for TV production and distribution is designed around the interlaced scanning format.

Currently, nearly all interlaced digital video content that is broadly distributed for TV display is compressed using the MPEG-2 video standard (ISO/IEC 13818-2). The MPEG-2 standard has specific tools for support of interlaced video, and in fact is one of the few major differences between MPEG-2 and its predecessor, MPEG-1. The extra tools in MPEG-2 for interlace add a significant degree of complexity to both encoders and decoders, with associated costs. Use of the interlaced tools also has a cost in terms of compressed bit rate. Some newer, more advanced compression standards including those under development, such as MPEG-4 part 10, currently being standardized by the Joint Video Team (JVT) of the ITU-T Q.6/16 Video Coding Experts Group (VCEG) and the ISO/IECJTC1/SC29/WG11 Moving Picture Experts Group (MPEG) where this standard is also known as AVC (advanced video coding), are still in the process of providing a standard set of interlaced coding tools. Interlaced coding tools such as those in MPEG-2 add considerable complexity to encoders and decoders, add syntax to the compressed bit stream which costs bit rate, and cause technical problems when combined with other advanced compression features such as deblocking. Compression tools that are specific to interlaced video tend to cause some problems with compression efficiency, since an encoder is required to make decisions between interlaced and progressive modes at many points in the syntax. It is not always the case that either decision serves the purpose of optimal compression.

The problem of compressing interlaced video content is complicated by the very nature of interlaced video and the way it is perceived by humans. Content with fast motion has an effective temporal resolution equal to the field rate, which is twice the frame rate, while content with high vertical bandwidth may only be accurately represented if it is not moving or moving only very slowly. Fortunately, humans have difficulty perceiving high spatial resolution of objects that are moving fast, so interlaced video does a reasonable job of presenting video with a combination of some fast motion and some high vertical detail at the same time. However, digital compression of interlaced content is impeded by the need to encode accurately what is important to human perception. There is particular difficulty for scenes or pictures that contain both fast motion and fine vertical detail at the same time.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Certain embodiments of the present invention provide a method and system for converting fields of interlaced frames of video to vertically aligned frames of video before performing video compression, transmission or storage, and decompression.

A method is provided for vertically phase shifting fields of at least one interlaced frame of video into at least two vertically aligned frames of video. The at least two vertically aligned frames of video are compressed, transmitted or stored, decompressed, and phase shifted a second time to generate at least one interlaced frame of video.

A video system is provided comprising a vertical phase shifter that converts fields of at least one interlaced frame of video into at least two vertically aligned frames of video. A second vertical phase shifter converts the at least two vertically aligned frames of video back into at least one interlaced frame of video. A compressor is provided to compress the at least two vertically aligned frames of video and a decompressor is provided to decompress the at least two vertically aligned frames of video.

These and other advantages and novel features of the present invention, as well as details of an illustrated embodiment thereof, will be more fully understood from the following description and drawings.

DETAILED DESCRIPTION OF THE INVENTION

Aspects of the present invention provide a single unified solution that provides optimal compression performance for interlaced video containing any arbitrary combination of fast (or slow) motion and fine vertical detail, without the need to make mode decisions between the two, and without the need to spend any bits in the bit stream to indicate such decisions. The solution is simple to implement in both encoders and decoders, and provides efficient compression with high video quality in all cases of great or small motion and great or small vertical detail.

Figure 1:
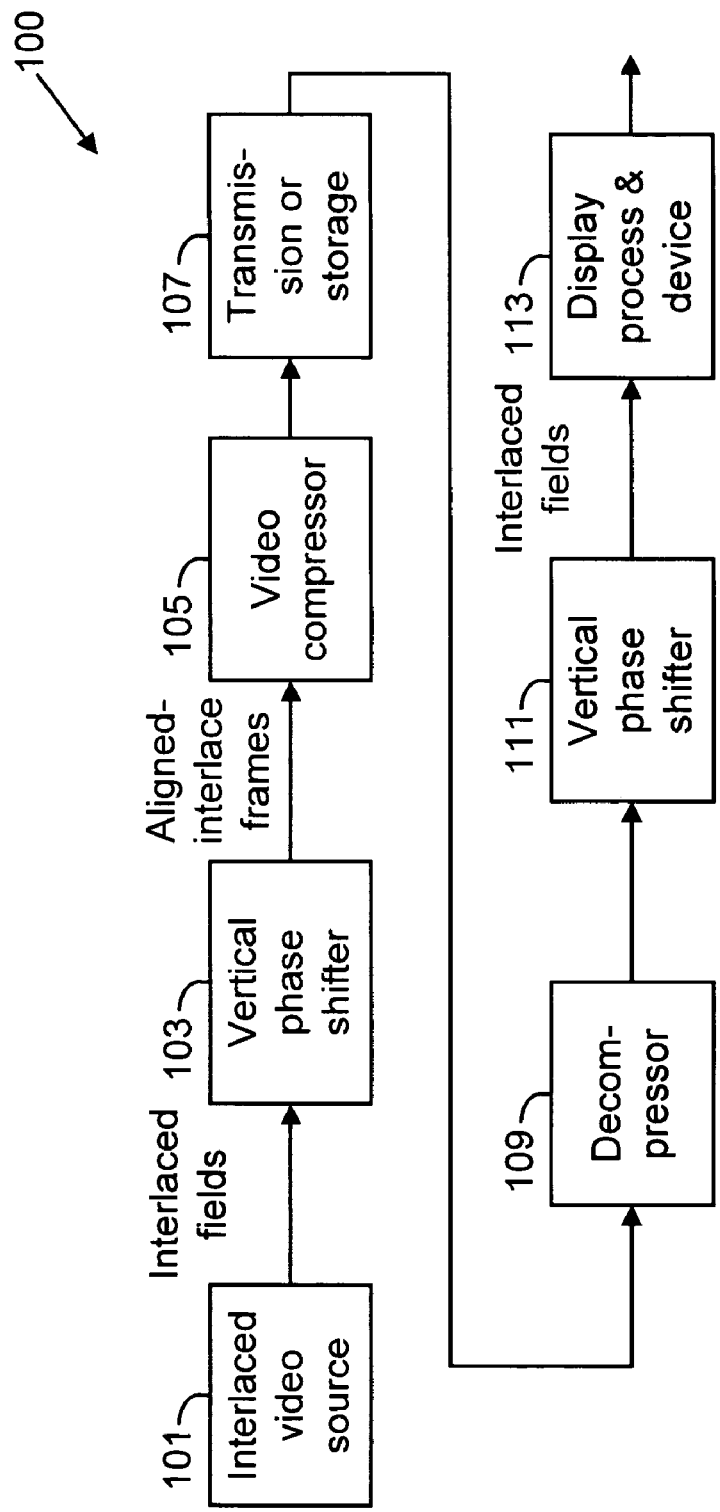
FIG. 1 is a schematic block diagram of an exemplary video system in accordance with an embodiment of the present invention.
Figure 2:
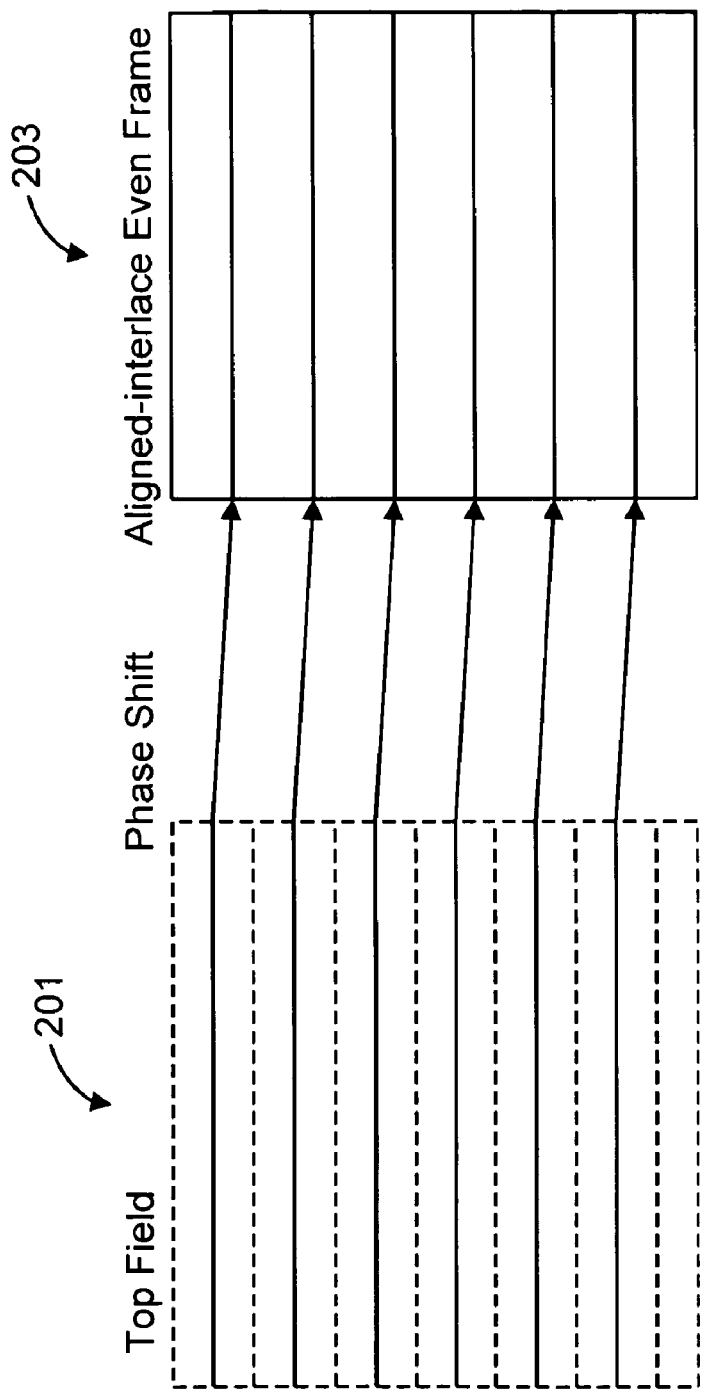
FIG. 2 illustrates vertically shifting a top field of an interlaced video frame, using the system of FIG. 1, to generate an aligned even frame in accordance with an embodiment of the present invention.
Figure 3:
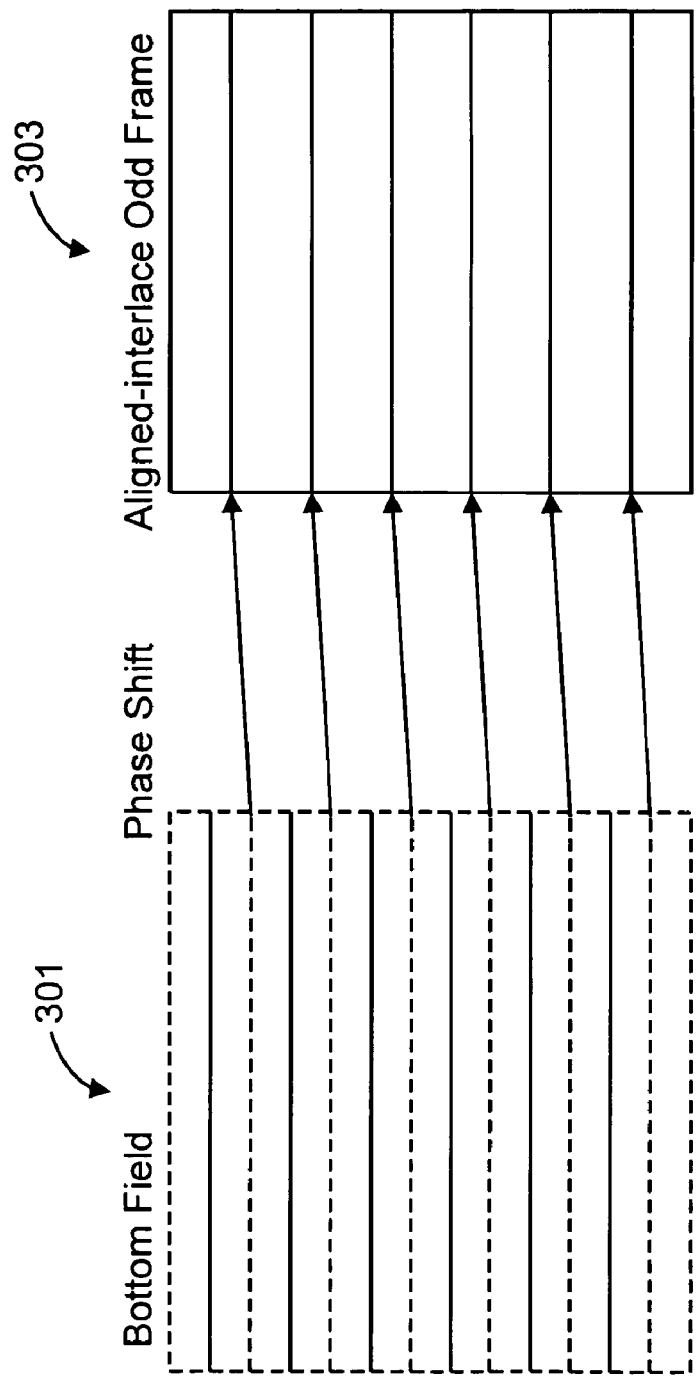
FIG. 3 illustrates vertically shifting a bottom field of the interlaced video frame of FIG. 2, using the system of FIG. 1, to generate an aligned odd frame in accordance with an embodiment of the present invention.
Figure 4:
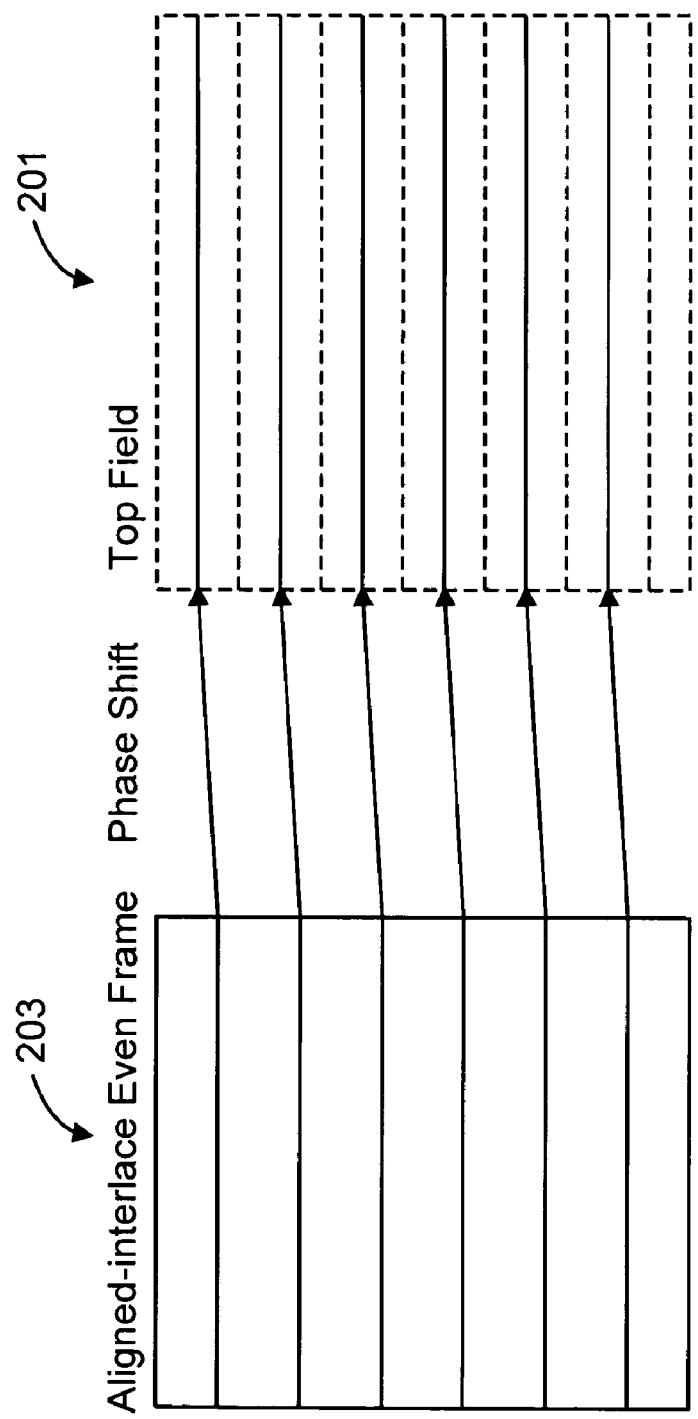
FIG. 4 illustrates vertically shifting the aligned even frame of FIG. 2, using the system of FIG. 1, to a top field of an interlaced video frame in accordance with an embodiment of the present invention.
Figure 5:
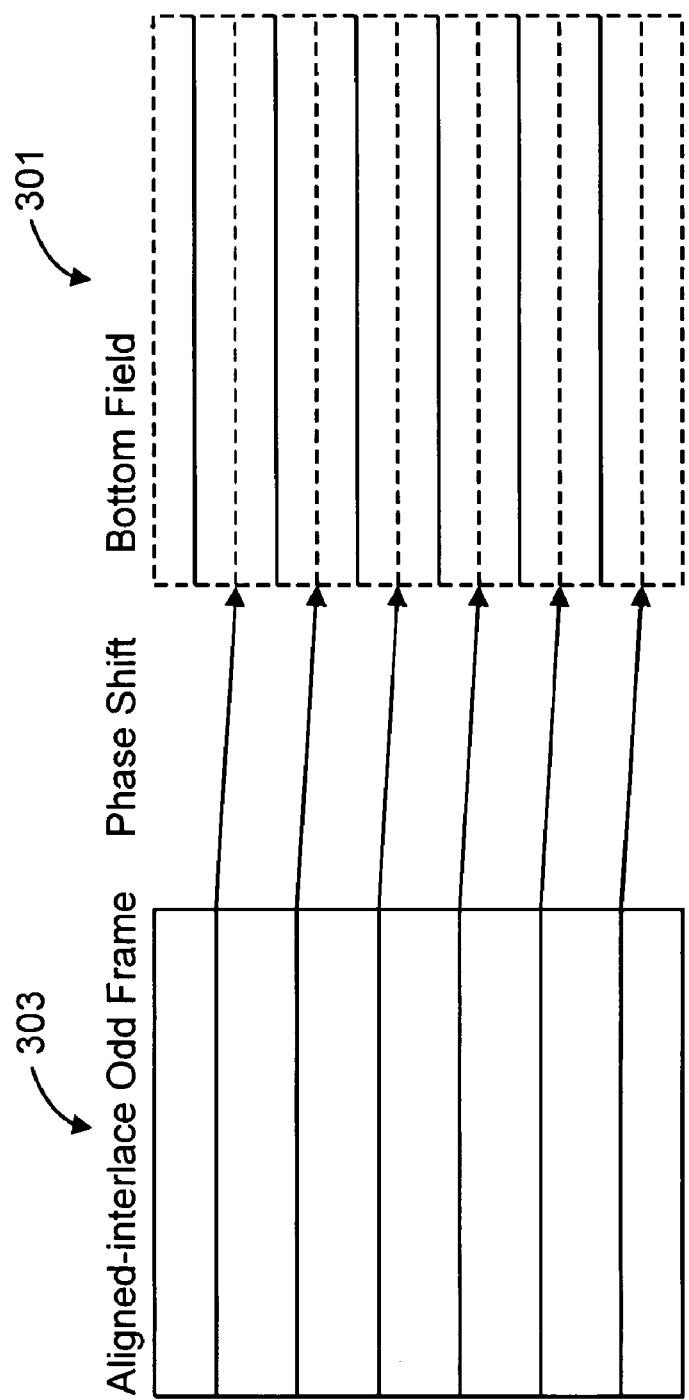
FIG. 5 illustrates vertically shifting the aligned odd frame of FIG. 3, using the system of FIG. 1, to a bottom field of the interlaced video frame of FIG. 4 in accordance with an embodiment of the present invention.

FIG. 1 illustrates one embodiment of an overall system 100 in accordance with the present invention. Fields of interlaced video (e.g., reference numeral 201 of FIG. 2 and reference numeral 301 of FIG. 3) from a video source 101 are shifted vertically, using a vertical phase shifter (e.g., filter) 103, such that they are aligned vertically with one another. This produces video that resembles progressive video at twice the frame rate and half the frame height of the original video. The resulting pictures are referred to as pseudo-progressive frames, or just frames, with designations of "even" (e.g., reference numeral 203 of FIG. 2) and "odd" (e.g., reference numeral 303 of FIG. 3), respecting the positions of the fields of video that were input to the process. The resulting aligned frames are input to a video compression process (video compressor 105) that does not need any specific support for interlaced content, and the compression process produces a compressed bit stream. The compressed bit stream is then typically transmitted or stored (block 107). Upon receipt or retrieval of the compressed bit stream, the compressed bit stream is then decompressed by a decompressor 109 that is compatible with the compressed format. The decompressed pictures (e.g., reference numeral 203 of FIG. 4 and reference numeral 303 of FIG. 5) are replicas of the vertically aligned pseudo-progressive frames that were input to the compression process. The resulting pictures are vertically phase shifted by vertical phase shifter (e.g., filter) 111 to become interlaced video. The interlaced picture (fields) that result (e.g., reference numeral 201 of FIG. 4 and reference numeral 301 of FIG. 5) are provided to a display process for display on any interlaced display device 113, such as a TV.

Alternatively, the results of decompressing the compressed video in accordance with an embodiment of the present invention may be input to a de-interlacing system and converted to a progressive format for display on any progressive display device. Aspects of the present invention aid in the de-interlacing process.

In accordance with an embodiment of the present invention, interlaced video content is phase shifted vertically (e.g., vertical phase shifter 103) such that fields of video that were originally interlaced become aligned in the vertical axis. In one embodiment of the present invention, the phase shift is a downward phase shift of ¼ of one scan line, in units of field (not frame) scan lines, for top fields, and an upward phase shift of ¼ scan line for bottom fields. The alignment is performed on video before it is input to a compression process. The phase shift may be a pure vertical phase shift. Practical phase shift filters that perform well for such a purpose with adequately flat frequency response may readily be constructed with a modest number of taps. A suitable example of such filters is given below.

The compression process performed by, for example, video compressor 105 of FIG. 1 may be any suitable compression process. Examples include the publicly available reference software for compression and decompression of various standards and standards under development, including MPEG-1 (ISO/IEC 11172-2), MPEG-2 (ISO/IEC 13818-2), MPEG-4 (ISO/IEC 14496-2), and JVT, also known as ITU H.264 and MPEG AVC. The compression process does not need to include any specific tools or methods to support interlaced content. The compression process may treat the video as a purely progressive frame sequence, and still produce good to excellent results. The compression process may benefit from the use of some modern compression tools such as multi-frame prediction, as is found in the current draft (FCD) of MPEG AVC and ITU H.264 from the ITU-MPEG Joint Video Team. Preferably the compression process used indicates in its output bit stream the even and odd (or top and bottom) identity of each picture. However if such indication is missing, the information is readily inferred by other means, such as the PTS (presentation time stamp) information that is commonly included in the system layer of encoding, or via the temporal reference information that is included in standards such as MPEG-1 and MPEG-2, or by treating each frame as a single field with an identified polarity in AVC, or by user data indicating the even of odd polarity of some or all frames, or by various other means. The compressed data may be transmitted or stored (block 107 of FIG. 1) by any convenient means, if desired, as is well known in the art and commonly practiced. The compressed data is decompressed by a decompression process (e.g., decompressor 109 of FIG. 1) that is compatible with the chosen compression process. When the final decompressed video is intended for display on an interlaced display device, such as a conventional TV, the pictures that are output from the decompression process are phase shifted vertically (by, e.g., vertical phase shifter 111 of FIG. 1) to form interlaced fields. The fields are similar to the interlaced fields that were originally input to the phase shift process that preceded the compression process. The results are then passed to the display device (block 113 of FIG. 1) in the conventional manner for display.

Alternatively, when the output is destined for a progressive display device, such as a progressive TV, a computer monitor, a flat panel or a projector, the resulting pictures may be de-interlaced by any of a number of deinterlacing methods such as those that are currently known in the art. The decompressed pictures may be phase shifted vertically as if they were to be displayed in an interlaced format, and the resulting interlaced fields may be input to a conventional or inventive de-interlacing process. Other conversion methods are possible as well. Aspects of the present invention provide assistance to some possible de-interlacing processes.

Any horizontal resolution or number of samples per line may be used in connection with the present invention. Consider, for example, that the maximum resolution of standard definition TV is 720 pixels per line, according to the ITU-T Recommendation Bt 601. Video may be scaled, however, to a smaller horizontal size such as 352, 480, 512, 528, 544, or 640 samples per line before compression, and optionally to scale the decompressed video up to a suitable size for display. Similar theories and methods apply to high definition (HD) TV, with typically large numbers of pixels per line. All of this may be practiced in connection with the present invention. In other words, any horizontal resolution, whether scaled or not, may be used.

An interlaced field of video constitutes a sample in both time and space of a video sequence. The temporal sampling is in units of approximately 60 fields per second for NTSC video, or approximately 50 fields per second for PAL or SECAM video. The spatial position of each field alternates between a "top" field position (see, e.g., FIG. 2) and a "bottom" field position (see, e.g., FIG. 3), such that a combination of any successive pair of fields covers all of the lines of one frame of video.

For images or regions of images whose vertical bandwidth does not exceed the Nyquist limit of one field, a single field is adequate to sample the vertical spatial resolution of those images or regions of images, as is well known from established theory originated by Nyquist. The Nyquist limit for one field of, e.g., 240 lines is 120 cycles per picture height. A video format with 240 lines per field has 480 lines per frame. Such numbers are characteristic of video that is compatible with the NETS standard. The Nyquist limit for a complete frame of video is a frequency that is half the frame height. For example, with 480 lines per frame, the maximum frequency that may be represented and reconstructed is 240 cycles per picture height. In the case of interlaced video, the effective upper limit of vertical frequency as perceived by humans is around 0.6 to 0.7 the Nyquist limit for a frame and is greater than the maximum vertical frequency that may be represented by any one field, and is less than the maximum vertical frequency that may be represented if all the lines of a frame were sampled at one time (i.e. if the video were progressively scanned). The factor of approximately 0.6 to 0.7 is commonly known as the Kell factor. The Kell factor indicates that it is possible for images or regions of images to have vertical bandwidth that is somewhat in excess of the maximum that may be represented by one field, since the Nyquist limit for one field is 0.5 times the Nyquist limit for one progressive frame. The extra vertical bandwidth between 0.5 and 0.6 or 0.7 of the Nyquist limit for frames is available in interlaced video where there is little or no motion in the video. For scenes or elements of scenes where there is fast motion, the useful vertical bandwidth is limited to that of pure fields, i.e., 0.5 time the Nyquist limit for frames.

With each field of video phase shifted vertically such that they are aligned vertically, the resulting video is almost the same as progressive video at the frame rate and frame height of the fields of the interlaced video. For example, with 60 fields per second at 240 lines per field, the result of the phase shift resembles 60 frames per second at 240 lines per frame. This is in contrast to the 30 frames per second and 480 lines per frame that is obtained from interlaced video using the same field structure. For static elements or regions of the video content where the vertical bandwidth does not exceed the Nyquist limit for single fields (which have been converted to aligned-interlace frames), the content is adequately represented by a single field (converted to a frame). The phase shifting of the present invention reduces the differences between successive aligned-interlaced frames such that the differences represent only either high vertical frequencies or motion.

Where the content is relatively static and has greater vertical bandwidth than the Nyquist limit imposed by a single field, the additional vertical bandwidth causes spatial aliasing in the conventional video fields that are input to the process described by the present invention. This is normal in interlaced video and is part of how conventional interlaced video currently works. In the context of the present invention, the aliasing manifests itself as a difference between successive aligned-interlaced frames. Note that in prior art systems where the video is not phase shifted vertically, there are differences between successive fields whether or not there are high vertical frequency elements in the scene, simply due to the difference in vertical positions of the top and bottom fields.

Where the content has significant motion, the aligned interlaced fields represent the motion content accurately as a progressive video sequence with a frame rate equal to the original field rate.

In all cases of video content, whether or not the content contains vertical signal bandwidth in excess of the Nyquist limit for a single field, and whether or not there is significant motion in the content, the aligned interlaced frames of the present invention may be efficiently compressed using any of a number of conventional techniques for compression of progressive video. One such compression method which is suitable is the test model software under development in the Joint Video Team of ITU-T Q.15/SG16 and ISO MPEG, which is working on the proposed Recommendation H.264 and the MPEG AVC (MPEG-4 Part 10) Standard.

The efficiency of compression of aligned-interlace frames may be improved through the use of multi-frame prediction, particularly in the case of regions of images with vertical detail above the Nyquist limit for a single field where the motion is nil or small. The differences between even and odd frames are such that, in such a case, a given even frame is efficiently predicted from the previous even frame, which occurred two frames earlier, and a given odd frame is efficiently predicted from the previous odd frame, which occurred two frames earlier. Multi-frame prediction is not necessary for the beneficial practice of the present invention.

After decompression, the decompressed aligned-interlace frames resemble the aligned-interlace frames that were input to the compression process. As discussed above, in accordance with the present invention, decompressed aligned-interlace frames of video are phase shifted to match the vertical positions of the original interlaced fields that were input to the first vertical phase shift described herein. The result is a sequence of interlaced video fields that resemble the original interlaced video fields. The interlaced fields may be displayed on an interlaced display device such as a TV, or converted to a progressive display format by any convenient process or mechanism. Alternatively, the decompressed aligned-interlaced frames may be converted directly to a progressive display format without undergoing the separate step of first performing vertical phase shifting to convert to an interlace format and then converting the result to a progressive format.

As mentioned above, a vertical phase shifter is used. It is desirable that the vertical phase shifter that precedes compression vertically align interlaced fields without introducing any distortion that adversely affects the visual results. An example is a phase adjustment that shifts top fields down by ¼ of a scan line, in units of field (not frame) lines, and adjusts bottom fields up by a similar amount. It is desirable that the vertical phase shifter that follows decompression perform the opposite adjustment, shifting the aligned-interlace frames that originated from top fields (referred to as "even frames") up by ¼ scan line (again in field units), and shifting "odd frames," those that originated from bottom fields, down by ¼ scan line. Any suitable vertical phase shift filter design may be used. An example of a suitable vertical phase shift filter for use with the present invention is represented by the following set of coefficients:

¼ pixel phase shift down: (8 −46 253 49 −9 1)/256

¼ pixel phase shift up: (1 −9 49 253 −46 8)/256

In both filters shown above, the center for filtering is the tap with the value "253/256".

Theory and experiment show that a 2 tap phase shift filter does not perform as well. It is possible that even better results may be obtained through the use of a filter with more taps, e.g., 8 or more, a filter with different coefficients, or both. All such filters are contemplated by the present invention. The phase shift filter that is applied after decoding does not need to match the phase shift filter used by the encoder. There may be advantages in having the input and output phase shift filters match (in the sense of being complements to one another). It is also possible to adjust either the input or output filter independently to optimize such characteristics as ringing or bandwidth. For example, the following sets of input and output filters may benefit some applications.
Input filters:

¼ pixel phase shift down: (8 −34 228 68 −17 3)/256

¼ pixel phase shift up: (3 −17 68 228 −34 8)/256

In both filters shown above, the center for filtering is the tap with the value "228/256".

Output filters:

¼ pixel phase shift down: (8 −48 256 48 −9 1)/256

¼ pixel phase shift up: (1 −9 48 256 −48 8)/256

In both filters shown above, the center for filtering is the tap with the value "256/256".

As mentioned in the Background section, the state of the art today involves compression of interlaced content using MPEG-2 video, which has specific coding tools to support interlaced video. The MPEG-2 tools include field and frame structured pictures, field and frame prediction, and field and frame residual coding ("DCT").

Another, older method which is now much less commonly used is to treat each interlaced frame (which normally consists of two interlaced fields) as one progressive frame with the height of one field or less, and effectively sampled at the time of only one of the fields. In essence, such systems use only one field from each field pair as the input to the compression process, giving up both spatial and temporal resolution. Such formats are sometimes variously called SIF (standard image format) or CIF (common image format). CIF or SIF images produce visibly inferior quality to full interlaced frames (e.g. 480 lines or 576 lines). VCD (video compact disc) is a common format in use in some countries such as China that uses SIF format.

The MPEG-2 type of method may encode interlaced video with high quality, however it requires considerable complexity on the part of both the encoder and the decoder, and is less efficient in terms of bit rate and video quality than the results achievable using the present invention. In the MPEG-2 method, the encoder must decide whether each picture should be frame structured or field structured, and if frame structured, whether each macroblock should be frame or field predicted and whether each macroblock should be frame or field (residual) encoded. Each decision has the risk of being a less than optimal decision for the picture or macroblock, since it is quite possible, even common, for pictures and regions of pictures to have characteristics that are suited to both frame and field structuring. For example, a scene may be mostly static, or nearly static, with high degrees of vertical detail, while the same scene may have fast moving objects in it. In such cases, a field structured picture may not be as efficient for encoding as a frame structured picture, due to the highly detailed static regions, but the fast moving areas generally compress more efficiently using field structured pictures or macroblocks. The edges of the moving objects typically are not aligned with the macroblock structure of the picture (as specified by the MPEG-2 standard) and, therefore, any macroblocks that cover both some of the fast moving areas and some of the static areas typically have reduced coding efficiency or image quality than would be the case if such field/frame decisions did not need to be made. Further, the field and frame decisions for pictures, macroblock prediction and macroblock residual coding are signaled using bits in the compressed bit stream, increasing the bit rate and therefore impairing the compression efficiency.

In embodiments of the present invention, all pictures are structured the same way, and all macroblocks are structured the same way, and there are no decisions to be made of the sort included in the MPEG-2 interlaced coding method. The result is less complexity in both encoders and decoders, better image quality for a given bit rate and image, and lower bit rates. The same image quality, in both spatial and temporal domains, may be obtained using embodiments of the present invention as may be obtained with MPEG-2, at lower bit rates; and much lower bit rates may be used with embodiments of the present invention while still obtaining acceptable image quality.

Compared with the older prior art method such as progressive coding of SIF or CIF images, embodiments of the present invention give much better quality in both spatial and temporal domains. High vertical resolution may be obtained through the coding of all aligned-interlace frames, representing the information in both top and bottom fields in the original interlaced material. High temporal resolution may be obtained by likewise encoding all aligned-interlace frames, again representing all of the original interlaced fields. The high temporal resolution, i.e., approximately 60 fields (frames) per second for NETS compatible systems, and approximately 50 fields (frames) per second for PAL and SECAM compatible systems, is important for representing fast moving video content such as sports. The much-improved video quality may be obtained at bit rates that may be as low as or even lower than the bit rates used for CIF and SIF coding in current applications, when modern compression methods designed for progressive content, such as AVC, are used.

There is tremendous pressure in the world of video compression to produce increasingly better solutions. Many companies and universities are currently working to achieve better results by improving coding tools. Embodiments of the present invention are capable of saving a significant fraction of the compressed bit rate with no perceptual loss of quality. Equivalently, embodiments of the present invention are capable of improving perceptual quality at a given bit rate. Embodiments of the present invention reduce the complexity of encoders and decoders, therefore, leading to low-cost implementations. Embodiments of the present invention may be used with encoders and decoders whose coding tools were never designed to provide explicit support for interlaced video.

In summary, aspects of the present invention provide for reduced compressed bit rates, improved video quality, or both, combined with reduced complexity of both encoders and decoders, when compared with all known prior art, independently of any other methods that may be used for compression of interlaced video content. Embodiments of the present invention may readily be combined with any compression method, whether old or new, and provide the advantages mentioned above in all known cases. Embodiments of the present invention are suitable for use with video coding methods that require deblocking, without introducing the complexity of trying to combine deblocking with adaptive field/frame macroblock types. Embodiments of the present invention are also easy to implement using existing methods for phase shift filter design and implementation. Embodiments of the present invention may even be used with some existing MPEG-1 and MPEG-2 decoders in cases where the decoders or decoder systems include good quality vertical phase shift filters in the display path.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A video system for processing video data, said video system comprising:
  a decompresser for decompressing a compressed top field and compressed bottom field for at least one frame, wherein the compressed top field and compressed bottom field are vertically aligned with respect to each other, thereby generating a top field and bottom field for the at least one frame, wherein the top field and bottom field are vertically aligned with respect to each other; and
  a vertical phase shifter for selectively phase shifting the top field and bottom field of the at least one frame so that the top field and bottom field are offset by one line with respect to each other, if the at least one frame is to be displayed on an interlaced display, wherein selectively phase shifting comprises not phase shifting at least one line of the at least one frame.

2. The video system of claim 1, further comprising:
  a deinterlacer for deinterlacing the top field and bottom field that are vertically aligned with respect to each other, if the at least one frame is to be displayed on a progressive display.

3. The video system of claim 1, further comprising:
  a vertical phase shifter for selectively phase shifting the top field and bottom field of the at least one frame so that the top field and bottom field are offset by one line with respect to each other, if the at least one frame is to be displayed on an interlaced display, wherein selectively phase shifting further comprises not phase shifting at least one line of the at least one frame.

* * * * *